(12) United States Patent
Kado et al.

(10) Patent No.: US 8,027,389 B2
(45) Date of Patent: Sep. 27, 2011

(54) INTERFACE CIRCUIT

(75) Inventors: Takeshi Kado, Nara (JP); Hideo Imai, Kyoto (JP)

(73) Assignee: Panasonic Corporation, Osaka (JP)

( * ) Notice: Subject to any disclaimer, the term of this patent is extended or adjusted under 35 U.S.C. 154(b) by 677 days.

(21) Appl. No.: 12/093,689

(22) PCT Filed: Dec. 6, 2006

(86) PCT No.: PCT/JP2006/324360
§ 371 (c)(1),
(2), (4) Date: May 14, 2008

(87) PCT Pub. No.: WO2007/072684
PCT Pub. Date: Jun. 28, 2007

(65) Prior Publication Data
US 2009/0046785 A1    Feb. 19, 2009

(30) Foreign Application Priority Data

Dec. 22, 2005    (JP) .................................. 2005-369967

(51) Int. Cl.
*H04B 3/00*    (2006.01)
(52) U.S. Cl. ........ 375/257; 359/589; 307/409; 375/288; 315/39

(58) Field of Classification Search .................... None
See application file for complete search history.

(56) References Cited

U.S. PATENT DOCUMENTS

| 4,839,908 A | 6/1989 | Takayama |
| 2003/0099208 A1* | 5/2003 | Graziano et al. ............. 370/286 |

FOREIGN PATENT DOCUMENTS

| JP | 60-153236 | 8/1985 |
| JP | 62-179043 | 8/1987 |
| JP | 11-17518 | 1/1999 |

* cited by examiner

*Primary Examiner* — Dac Ha
*Assistant Examiner* — Adolf Dsouza
(74) *Attorney, Agent, or Firm* — McDermott Will & Emery LLP

(57) ABSTRACT

A transmission circuit (101) for transmitting data onto a transmission line, and a mask circuit (102) for generating a mask signal (105) for removing a reflected wave based on a transmission timing notification signal (104) supplied form the transmission circuit (101) are provided. For example, a timer circuit (301) causes the mask signal (105) to be effective only for a predetermined time immediately after transmission. A logic circuit (302) is used to remove a reflected wave from the received signal (106) based on the mask signal (105), and a resultant masked received signal (107) is input to a reception circuit (103).

4 Claims, 4 Drawing Sheets

INTERFACE CIRCUIT

RELATED APPLICATIONS

This application is the U.S. National Phase under 35 U.S.C. §371 of International Application No. PCT/JP2006/324360, filed on Dec. 6, 2006, which in turn claims the benefit of Japanese Application No. 2005-369967, filed on Dec. 22, 2005 the disclosures of which Applications are incorporated by reference herein.

TECHNICAL FIELD

The present invention relates to an interface circuit for performing high-speed communication, and more particularly, to an interface circuit for addressing a reflected wave.

BACKGROUND ART

In the conventional art, reflected waves are reduced by adjusting an output impedance to eliminate an impedance mismatch occurring in a sender circuit, for example. Specifically, an output circuit for varying an output impedance in accordance with a control signal, a dummy transmission line connected to the output circuit and equivalent to an actual load transmission line, a voltage detecting circuit connected to the other end of the dummy transmission line and for detecting an initial voltage amplitude from the output circuit, and an impedance control signal generating circuit for generating a control signal for controlling the output impedance based on the detected voltage value (see Patent Document 1). Patent Document 1: Japanese Unexamined Patent Application Publication No. H11-17518

DISCLOSURE OF THE INVENTION

Problems to be Solved by the Invention

However, the above-described conventional technique is based on the assumption that the impedance of an actual transmission line is equal to that of the dummy transmission line. Therefore, when the impedances of the transmission line and the dummy transmission line are not equal, there is an impedance mismatch, so that a reflected wave still occurs.

Particularly, in the case of an interface, such as USB (Universal Serial Bus) or the like, the user freely changes cables or connection devices, so that there is a possibility that the interface is connected to various devices available on the market. Among the devices on the market, there are a number of devices having impedances deviated from the standards. Therefore, there is a limit on adjustment of the output impedance for addressing reflected waves. Reflected waves should be addressed by another technique.

Solution to the Problems

To solve the above-described problem, the present invention provides a technique for addressing a reflected wave by masking it.

Specifically, an interface circuit according to the present invention comprises a transmission circuit connected to a transmission line, a reception circuit for receiving a signal via the transmission line from a communication party, and a masking means for masking a reflected wave of a signal transmitted to the transmission line by the transmission circuit, based on a transmission timing notification signal from the transmission circuit, to supply to the reception circuit only a signal received via the transmission line from the communication party.

Effect of the Invention

The interface circuit of the present invention can address a reflected wave, which cannot be achieved by the above-described conventional technique.

DESCRIPTION OF THE REFERENCE CHARACTERS

Figure 1:
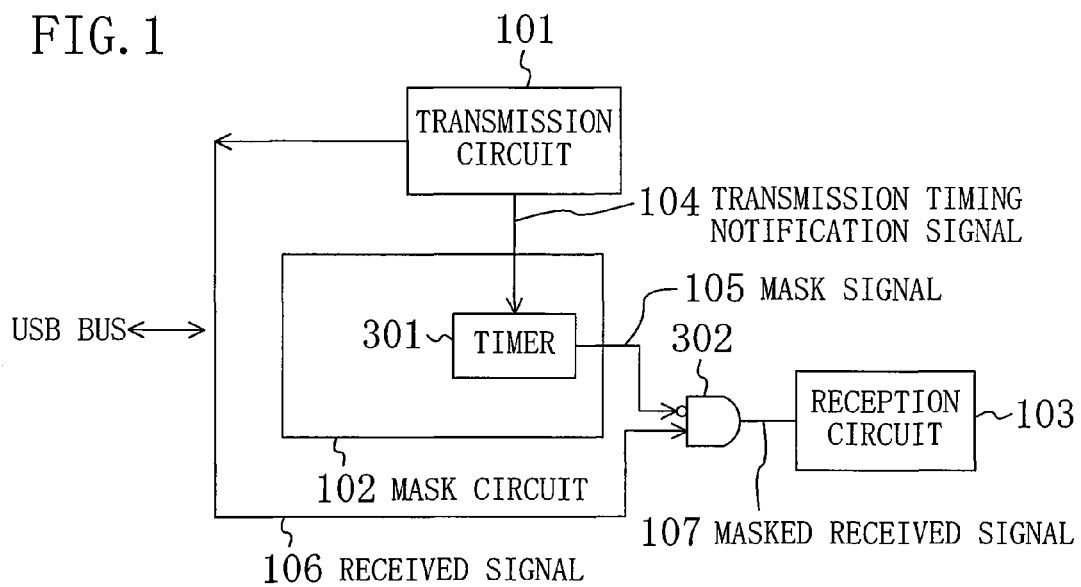
FIG. 1 is a block diagram of an interface circuit according to a first embodiment of the present invention.

101 transmission circuit
102 mask circuit
103 reception circuit
104 transmission timing notification signal
105 mask signal
106 received signal
107 masked received signal
201 transmitted waves
202 reflected waves
203 received waves
301 timer circuit
302 logic circuit
401 time measuring circuit
501 intensity measuring circuit
502 threshold setting circuit
601 time setting circuit
602 reception timing notification signal
701 reception timing notification signal
801 mask interruption signal
802,803 logic circuit
901 mask time update signal
T mask time

BEST MODE FOR CARRYING OUT THE INVENTION

Hereinafter, embodiments of the present invention will be described with the accompanying drawings.

First Embodiment

FIG. 1 is a diagram showing a first embodiment of the present invention. In FIG. 1, 101 indicates a transmission circuit for transmitting a packet to a USB bus, 103 indicates a reception circuit for receiving a packet from the USB bus, 102 indicates a mask circuit for receiving a transmission timing notification signal 104 from the transmission circuit 101 and determining timing of masking of a signal on the USB bus, and 302 indicates a logic circuit for masking a received signal 106 from the USB bus only for an effective period of time of a mask signal 105 and supplying a masked received signal 107 to the reception circuit 103. The mask circuit 102 comprises a timer circuit 301 for causing the mask signal 105 to go to a HIGH level only for a predetermined time after receiving the transmission timing notification signal 104.

Figure 2:
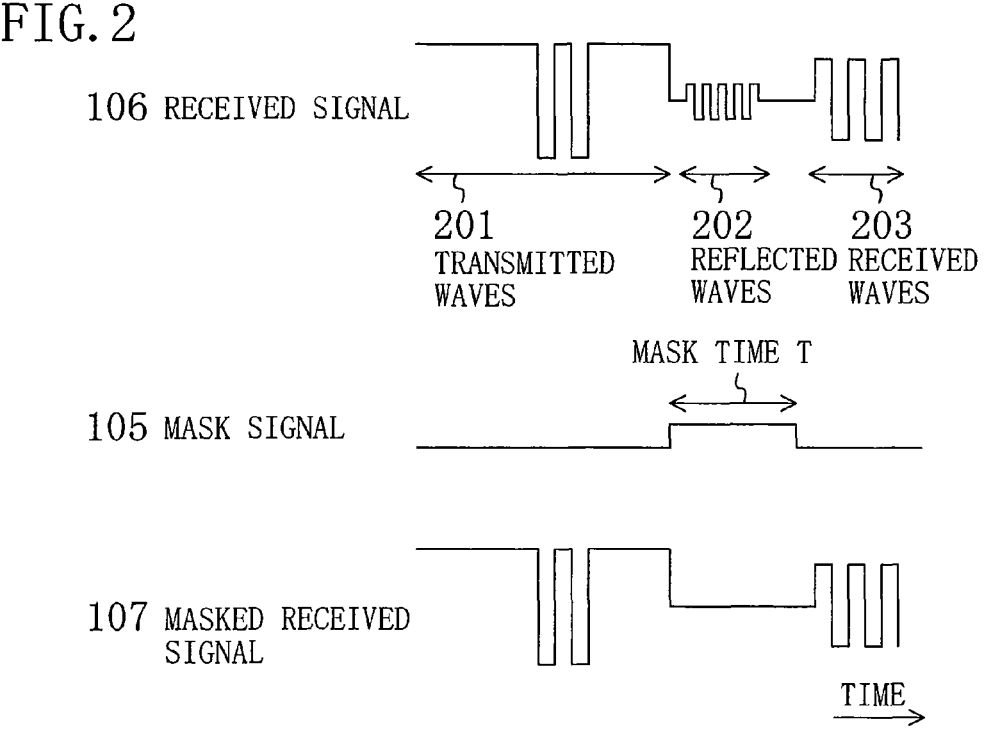
FIG. 2 is a timing diagram showing an operation of the interface circuit of FIG. 1.

FIG. 2 shows a relationship between reflected waves, and transmission and reception. In FIG. 2, 201 indicates transmitted waves, 202 indicates reflected waves emerging on the USB bus due to reflection of the transmitted waves 201, and 203 indicates received waves of packets to be received. T indicates a period of time for which the mask signal 105 is effective (HIGH), i.e., a mask time.

In FIG. 1, the mask signal 105 is effective for the mask time T after transmission. When the mask time T is set so that the reflected waves 202 are masked and the received waves 203 are not masked, the masked received signal 107 transmitted through the reception circuit 103 is a signal in which only the reflected waves 202 are masked, so that only a normal received signal is input to the reception circuit 103.

According to this embodiment, an erroneous operation due to a reflected wave can be prevented only by adding a simple circuit to the reception circuit 103.

Second Embodiment

Figure 3:
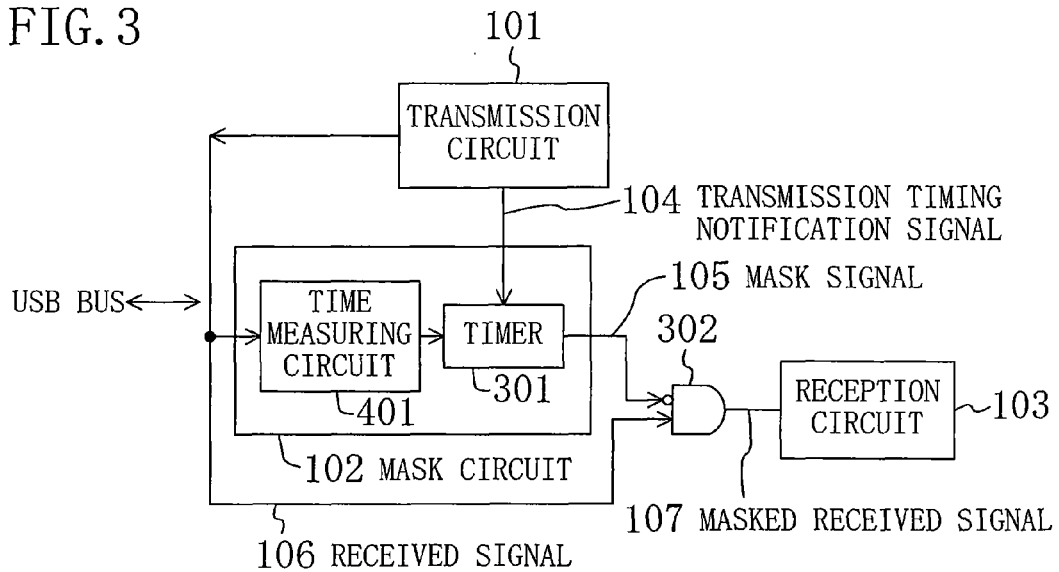
FIG. 3 is a block diagram of an interface circuit according to a second embodiment of the present invention.

FIG. 3 is a diagram showing a second embodiment of the present invention. In FIG. 3, a time measuring circuit 401 is a circuit for measuring a duration of a received signal immediately after transmission. A time measured by the time measuring circuit 401 is set in a timer circuit 301. A received signal which continues to exist immediately after transmission is considered to be reflected waves, and therefore, a received signal being measured can be considered to be reflected waves. The mask signal 105 is output from the timer circuit 301, and a masked received signal 107 in which reflected waves are masked is input to a reception circuit 103. The mask time T is contemplated to be updated when first communication is measured during the start of communication. Alternatively, the mask time T may be updated by a result from measurement after every transmission or after transmission of a specific signal. The mask time T during first communication may be set to be zero or may be previously set to have a fixed value as an initial value.

In the first embodiment, reflected waves can be masked only for a predetermined time, and when the duration of reflected waves exceeds what is expected, the reflected waves cannot be addressed. However, according to this embodiment, the mask time can be extended based on actual reflected waves, so that a wider range of reflected waves can be addressed than in the first embodiment.

Third Embodiment

Figure 4:
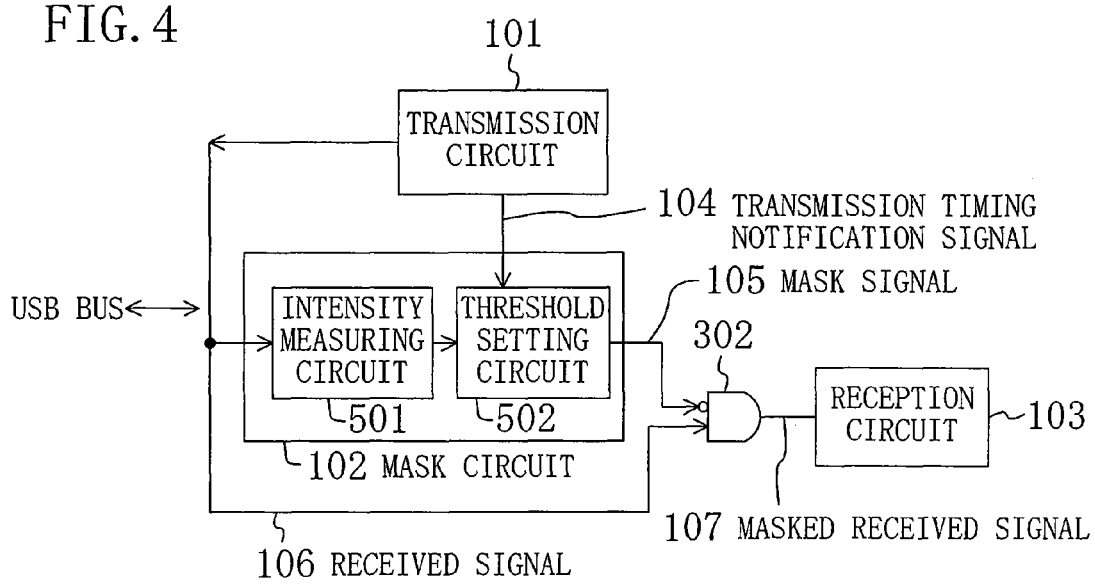
FIG. 4 is a block diagram of an interface circuit according to a third embodiment of the present invention.

FIG. 4 is a diagram showing a third embodiment of the present invention. In FIG. 4, an intensity measuring circuit 501 is a circuit for measuring an amplitude intensity of a signal waveform on a USB bus, and a threshold setting circuit 502 is a circuit for controlling a mask threshold based on the transmission timing notification signal 104 and a result of the intensity measuring circuit 501. An intensity of the reflected waves 202 of FIG. 2 is measured immediately after the end of transmission, and the result is supplied to the threshold setting circuit 502, which in turn generates a mask signal 105. The mask signal 105 is effective when the intensity measured by the intensity measuring circuit 501 is smaller than or equal to a previously measured intensity of reflected waves.

According to this embodiment, as in the second embodiment, a wider range of reflected waves can be addressed than in the first embodiment. In this embodiment, since the timing of masking is determined based on the intensity of reflected waves, when a difference between the intensity of reflected waves and an actual received signal can be measured, the reflected waves can be removed in a single way. Therefore, this embodiment can be configured with a simpler circuit than in the second embodiment.

Fourth Embodiment

Figure 5:
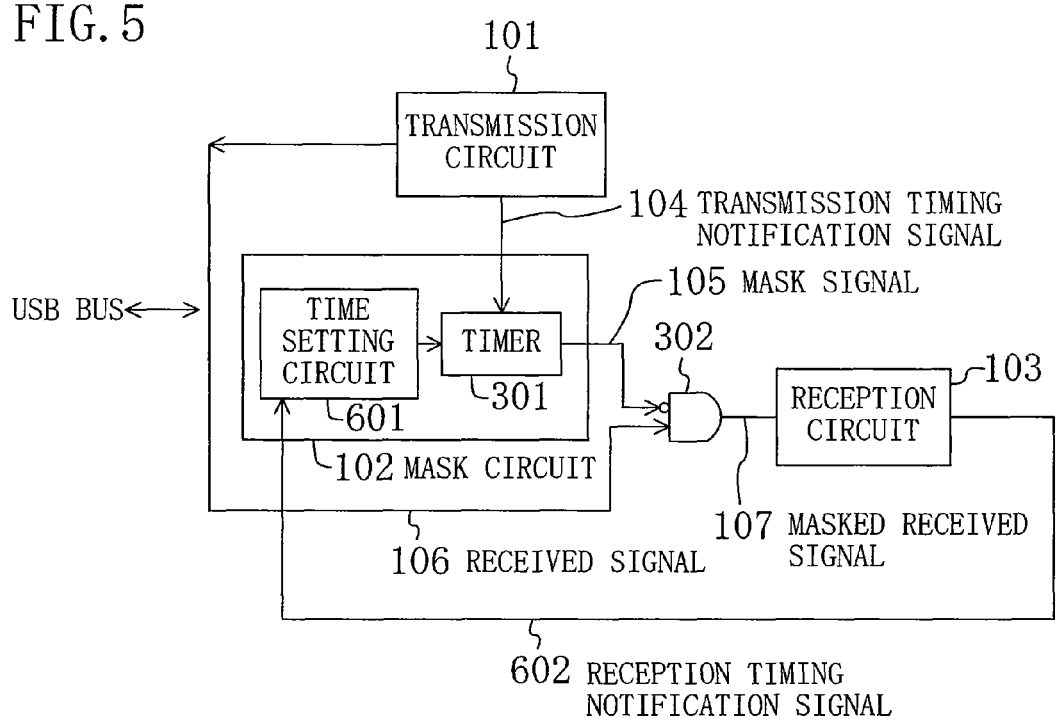
FIG. 5 is a block diagram of an interface circuit according to a fourth embodiment of the present invention.

FIG. 5 is a diagram showing a fourth embodiment of the present invention. In FIG. 5, a time setting circuit 601 is a circuit which is controlled in accordance with a reception timing notification signal 602 output by a reception circuit 103. The timing of reception of a received waveform which has been normally received by the reception circuit 103 is conveyed via the reception timing notification signal 602 to the time setting circuit 601. The conveyed reception timing indicates a time of the arrival of the received waves 203 in FIG. 2. The time setting circuit 601 sets a time until the arrival of the received waves 203 as a mask time T into a timer circuit 301, so that a mask signal 105 is effective for a time when the reflected waves 202 can be masked.

According to this embodiment, the mask range is determined based on a received waveform, and therefore, a circuit for measuring reflected waves is not required. If variations in intensity of reflected waves make it difficult to measure the reflected waves, then when this embodiment is employed, the mask range can be advantageously determined without measuring reflected waves.

Fifth Embodiment

Figure 6:
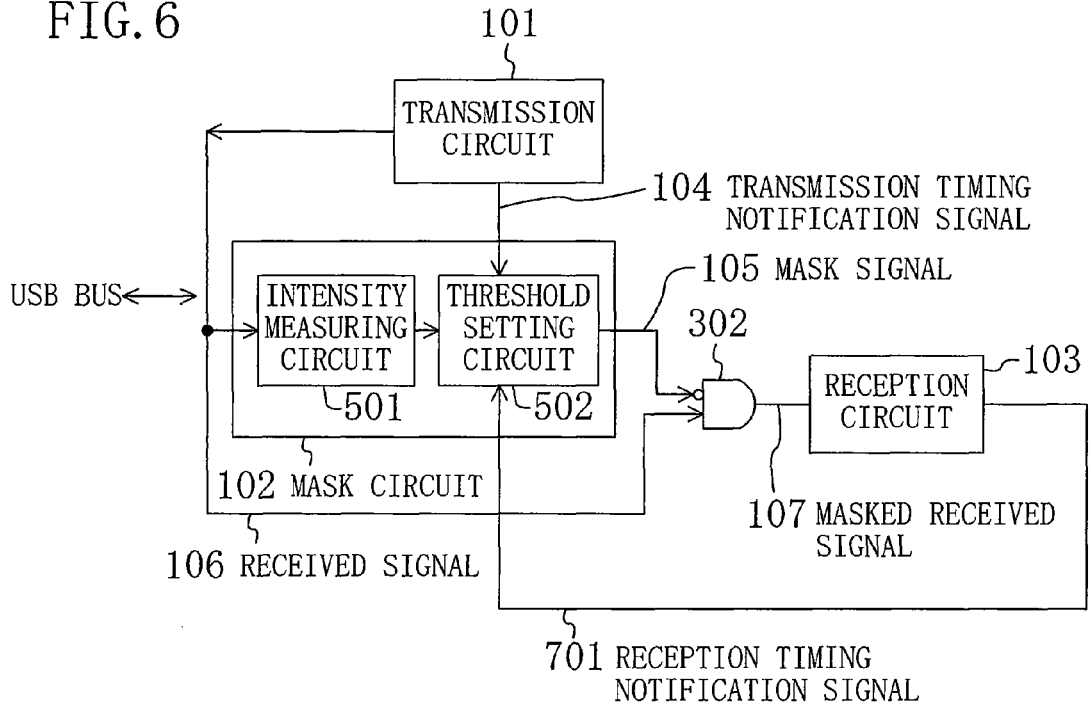
FIG. 6 is a block diagram of an interface circuit according to a fifth embodiment of the present invention.

FIG. 6 is a diagram showing a fifth embodiment of the present invention. In FIG. 6, a threshold setting circuit 502 is a circuit which is controlled in accordance with a reception timing notification signal 701 output by a reception circuit 103. The reception timing of a received waveform normally received by the reception circuit 103 is conveyed via the reception timing notification signal 701 to the threshold setting circuit 502. The conveyed reception timing becomes effective at a time of the arrival of the received waves 203 in FIG. 2. The threshold setting circuit 502, when the reception timing notification signal 701 becomes effective, takes in an intensity of the received waves 203 and determines a mask threshold.

According to this embodiment, an intensity to be masked is dynamically changed based on received waves. If the intensity of received waves is high, a mask threshold can be set to be higher, so that an erroneous operation due to reflected waves can be effectively prevented.

Sixth Embodiment

Figure 7:
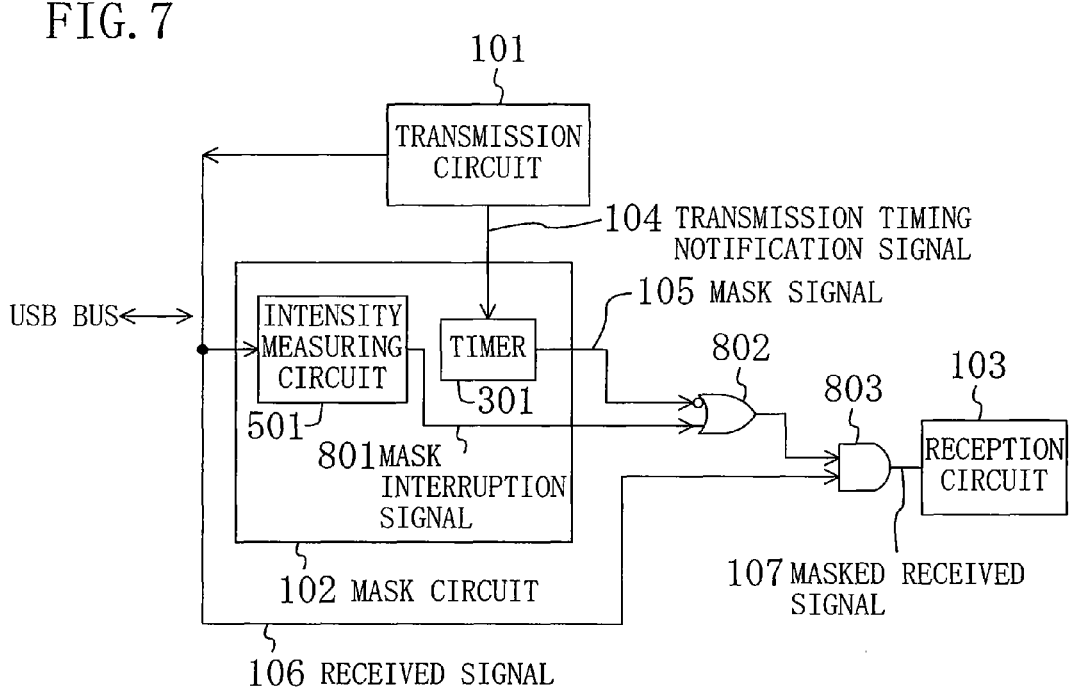
FIG. 7 is a block diagram of an interface circuit according to a sixth embodiment of the present invention.

FIG. 7 is a diagram showing a sixth embodiment of the present invention. In FIG. 7, an intensity measuring circuit 501 outputs a mask interruption signal 801 for interrupting masking when received waves having an intensity higher than or equal to that which is previously set. A timer circuit 301 receives a transmission timing notification signal 104 from a transmission circuit 101, and causes a mask signal 105 to be effective only for a previously set mask time T after transmission. First and second logic circuits 802 and 803 mask a received signal 106 when the mask signal 105 is at a HIGH level and the mask interruption signal 801 is at a LOW level, and interrupt masking when the mask interruption signal 801 goes to a HIGH level. Therefore, the mask interruption signal 801 can forcedly interrupt masking even when the mask signal 105 is effective, and can address received waves 203 even when they arrive within the set mask time T.

According to this embodiment, it is possible to provide a circuit capable of preventing an erroneous operation due to reflected waves and addressing an environment in which an original signal may be received within a mask time.

Seventh Embodiment

Figure 8:
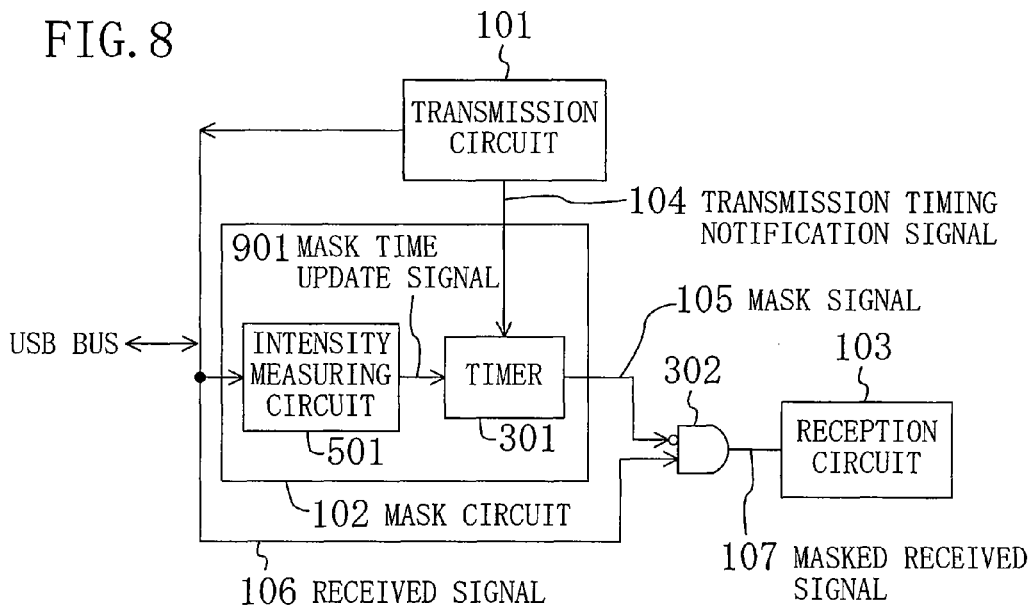
FIG. 8 is a block diagram of an interface circuit according to a seventh embodiment of the present invention.

FIG. 8 is a diagram showing a seventh embodiment of the present invention. In FIG. 8, an intensity measuring circuit 501 outputs a mask time update signal 901 which becomes effective when received waves having an intensity higher than that which is previously set, and is connected to a timer circuit 301. The timer circuit 301 receives a transmission timing notification signal 104 from a transmission circuit 101, and causes a mask signal 105 to be effective for a previously set time T after transmission. Note that the timer circuit 301 reduces the previously set mask time T when the mask time update signal 901 becomes effective within the mask time T. Specifically, a mask circuit 102 is operated not to mask a received signal 106 when received waves 203 arrive within the set mask time T.

According to this embodiment, it is possible to provide a circuit capable of preventing an erroneous operation due to reflected waves and addressing received waves arriving within a mask time by adjusting the mask time.

INDUSTRIAL APPLICABILITY

The interface circuit of the present invention is useful as a means for achieving a device which prevents an influence of reflected waves and is stably operated.

The invention claimed is:

1. An interface circuit, comprising:
a transmission circuit connected to a transmission line;
a reception circuit for receiving a signal via the transmission line from a communication party; and
a masking unit configured to mask a reflected wave of a signal transmitted to the transmission line by the transmission circuit, based on a transmission timing notification signal from the transmission circuit, to supply to the reception circuit a signal received via the transmission line from the communication party, wherein:
the masking unit comprises a timer circuit and a time measuring circuit,
the time measuring circuit measures a duration of a received signal immediately after transmission,
a mask time of the masking unit is controlled based on the duration measured by the time measured circuit, and
the mask time of the masking unit is set in the timer circuit.

2. The interface circuit of claim 1, wherein
as the mask time of the masking unit, a previously set initial value is used when reception is performed for the first time.

3. An interface circuit, comprising:
a transmission circuit connected to a transmission line;
a reception circuit for receiving a signal via the transmission line from a communication party; and
a masking unit configured to mask a reflected wave of a signal transmitted to the transmission line by the transmission circuit, based on a transmission timing notification signal from the transmission circuit, to supply to the reception circuit a signal received via the transmission line from the communication party, wherein:
the masking unit comprises a timer circuit and a time setting circuit,
the time setting circuit receives a reception timing notification signal which indicates a time when a normal received signal arrives,
a mask time of the masking unit is controlled based on the reception timing notification signal, and
the time setting circuit sets the mask time in the timer circuit.

4. The interface circuit of claim 3, wherein the reception timing notification signal is output by the reception circuit.

* * * * *